US012657116B2

(12) United States Patent
Tanuku et al.

(10) Patent No.: US 12,657,116 B2
(45) Date of Patent: Jun. 16, 2026

(54) SYSTEMS AND METHODS FOR TESTING FEDERATED MICROSERVICE ARCHITECTURES

(71) Applicant: JPMORGAN CHASE BANK, N.A., New York, NY (US)

(72) Inventors: Siva Tanuku, Westerville, OH (US); Serdar Kuyuk, Newark, DE (US); Liping Wu, Westerville, OH (US); Bhavya Potluri, Delaware, OH (US); Rudolph L. Mappus, IV, Plano, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 205 days.

(21) Appl. No.: 18/192,256

(22) Filed: Mar. 29, 2023

(65) Prior Publication Data

US 2024/0330160 A1     Oct. 3, 2024

(51) Int. Cl.
*G06F 11/3668* (2025.01)

(52) U.S. Cl.
CPC ...... *G06F 11/3684* (2013.01); *G06F 11/3688* (2013.01); *G06F 11/3692* (2013.01)

(58) Field of Classification Search
None
See application file for complete search history.

(56) References Cited

U.S. PATENT DOCUMENTS

| | | | | |
|---|---|---|---|---|
| 11,847,046 | B1 * | 12/2023 | Ayyadurai | .......... G06F 11/3684 |
| 2005/0166115 | A1 * | 7/2005 | Daume | .............. G06F 11/3447 |
| | | | | 714/E11.193 |
| 2019/0129832 | A1 * | 5/2019 | Budnik | ................. G06F 40/205 |
| 2022/0269591 | A1 * | 8/2022 | McShane | ............ G06F 11/3684 |

* cited by examiner

*Primary Examiner* — Lewis A Bullock, Jr.
*Assistant Examiner* — Mark A Gooray
(74) *Attorney, Agent, or Firm* — GREENBERG TRAURIG LLP

(57) ABSTRACT

Systems and methods for locality testing federated microservice architectures are disclosed. In one embodiment, a computer-implemented method for testing federated architectures may include: (1) associating a microservice testing application program with a set of microservices to create a simulated federated microservice architecture environment; (2) detecting, by the microservice testing application program, relationships associated with the set of microservices generating; (3) generating, by the microservice testing application program, test cases for testing a target microservice in the set of microservices; and (4) evaluating, by the microservice testing application program, a performance of the target microservice in the simulated federated microservice architecture environment based on the test cases.

17 Claims, 6 Drawing Sheets

300

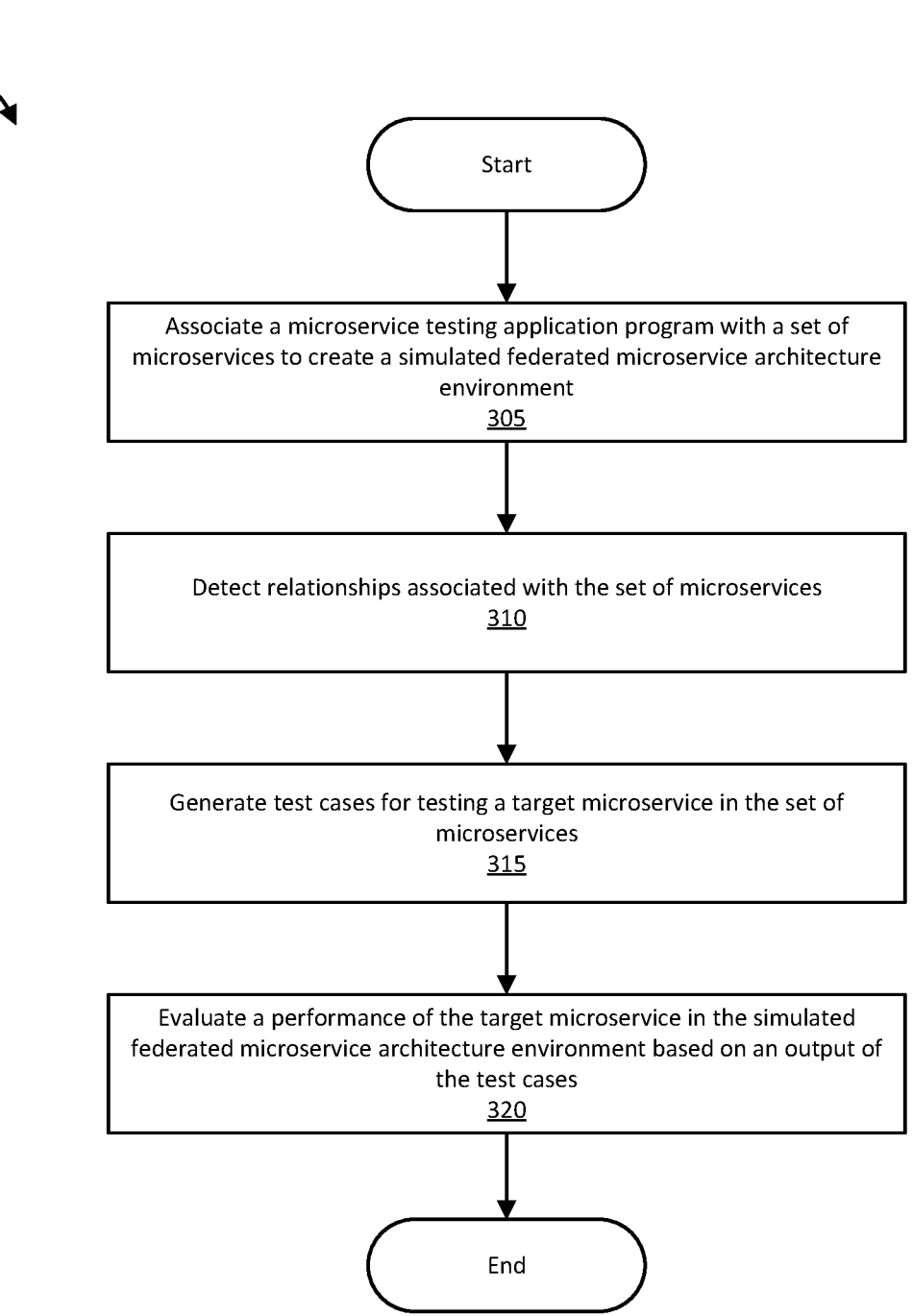

Start

Associate a microservice testing application program with a set of microservices to create a simulated federated microservice architecture environment
305

Detect relationships associated with the set of microservices
310

Generate test cases for testing a target microservice in the set of microservices
315

Evaluate a performance of the target microservice in the simulated federated microservice architecture environment based on an output of the test cases
320

End

SYSTEMS AND METHODS FOR TESTING FEDERATED MICROSERVICE ARCHITECTURES

BACKGROUND OF THE INVENTION

1. Field of the Invention

Embodiments generally relate to systems and methods for testing federated microservice architectures.

2. Description of the Related Art

Federated software architectures typically integrate microservices to accomplish a variety of enterprise-oriented tasks such as providing customer data services on cloud computing platforms. However, federated software architectures may often be required to undergo testing to ensure that microservices work together robustly and at scale. For example, end-to-end testing for federated microservices software architecture requires test and regression suites that provide coverage of service interactions, message passing, and code branches. The implementation of the aforementioned testing requirements, however, are often complicated in federated microservice architecture environments by the many interdependent applications that are typically needed to interact with public cloud services, thereby resulting in an inability to independently create and run test cases in automation and at scale (i.e., without depending on input/assistance from external teams associated with each microservice in an environment) and a potential reduction in overall performance due to inefficient testing.

SUMMARY OF THE INVENTION

Systems and methods for testing federated microservice architectures are disclosed. In one embodiment, a method for testing federated microservice architectures may include: (1) associating, by one or more computing devices, a microservice testing application program with a set of microservices to create a simulated federated microservice architecture environment; (2) detecting, by the microservice testing application program executing on the one or more computing devices, relationships associated with the set of microservices; (3) generating, by the microservice testing application program, test cases for testing a target microservice in the set of microservices; and (4) evaluating, by the microservice testing application program, a performance of the target microservice in the simulated federated microservice architecture environment based on an output of the test cases.

In one embodiment, the simulated federated microservice architecture environment may be created by adding the microservice testing application program as a new microservice to an existing federated microservice architecture environment.

In one embodiment, the microservice testing application program may detect the relationships associated with the set of microservices by: (1) receiving an initialization input for the microservice testing application program; and (2) discovering the set of microservices and the relationships in response to the initialization input.

In one embodiment, a generative adversarial network (GAN) may be utilized to generate the test cases. For example, in one embodiment, a GAN may be utilized for: (1) receiving historical test case data including a target variable from a data source; (2) training neural network models utilizing the historical test case data; and (3) generating training data candidates produced by an output of the neural network models. The generated training data candidates may then be utilized by the microservice testing application program as the test cases for testing the target microservice.

In one embodiment, the GAN may include a generator model and a discriminator model. The generator model may be trained on the historical test case data and the discriminator model may be trained on the historical test case data and fabricated negative test case data (i.e., synthetic data that are negative cases of event streams). The discriminator model may be further utilized to generate/assign scores to training data candidates produced by the generator network for evaluation against the target value to determine test case success or failure.

In one embodiment, data ranges of values for test cases (which may be user-specified or extracted from examples) may be provided to the microservice testing application program for sampling to generate the test cases. For example, in one embodiment, the microservice testing application program may be utilized for: (1) receiving range data for candidate test cases; (2) sampling the range data; and (3) generating the test cases from the sampled range data.

In one embodiment, the range data may be sampled by: (1) sampling discrete values from a set of possible range data values and/or (2) sampling numerical values from the range data.

In one embodiment, the performance of the target microservice may be evaluated by comparing the output of the test cases against a target variable to determine a result representing an expected performance of the target microservice.

In one embodiment, the target microservice may include a combination of microservices contained in the set of microservices.

In one embodiment, the test cases may include one or more call center customer service interactions in the simulated federated microservice architecture environment.

BRIEF DESCRIPTION OF THE DRAWINGS

For a more complete understanding of the present invention, the objects and advantages thereof, reference is now made to the following descriptions taken in connection with the accompanying drawings in which:

FIG. 3 depicts a method for testing federated microservice architectures according to an embodiment;

DETAILED DESCRIPTION OF PREFERRED EMBODIMENTS

Embodiments may improve the coverage, performance, and end-to-end testing of federated microservice architectures by providing a system for simulating an operational testing environment that allows a test operator to submit cases (e.g., via an exposed endpoint and an application programming interface (API) to each of a number of specified microservices or alternatively, a combination of microservices. For example, the system may trigger an input (which may include microservice endpoints and syntax for making requests (e.g., in restful services and/or GET and POST HTTP request methods for endpoints and payloads)) at one microservice and observing output from another as defined by the test case. The system is also able to receive input from performance testing tools so that generated test cases can be run at scale. The system may then log the test cases submitted as well as the responses from the microservices being tested.

The test cases may be generated from streams of historical customer interactions (e.g., conversations) with virtual call center services as they manage their accounts and complete transactions. In embodiments, a machine learning framework (such as a generative adversarial network (GAN)) may be utilized to receive historical data as streams of conversations (e.g., customer and specialists utterances as well as temporally ordered event identifiers) as initial training data to generate test cases based on an operational target variable stored in the historical data. The operational target variable may include a call reason given by specialists at the end of a customer interaction during a call center session. In embodiments, a GAN may be trained over several epochs to produce similar outputs (i.e., conversations). Test case outcomes are outputs (i.e., predicted customer intents) compared to the operational target variable.

By simulating an operational testing environment for testing microservices, embodiments disclosed herein may allow for utilizing a mock service (i.e., a testing microservice application program) for simulating the health of interdependent applications (i.e., microservices) that interact with public cloud services (e.g., on-demand cloud computing platforms, managed streaming services, and container services) as well as perform various load and performance tests, thereby overcoming the limitations of the "shift-left" concept for machine-learning systems (which becomes complicated when may interdependent applications interact with public cloud services) and further accelerate the development of a lifecycle for call center virtual agent assistants.

Figure 1:
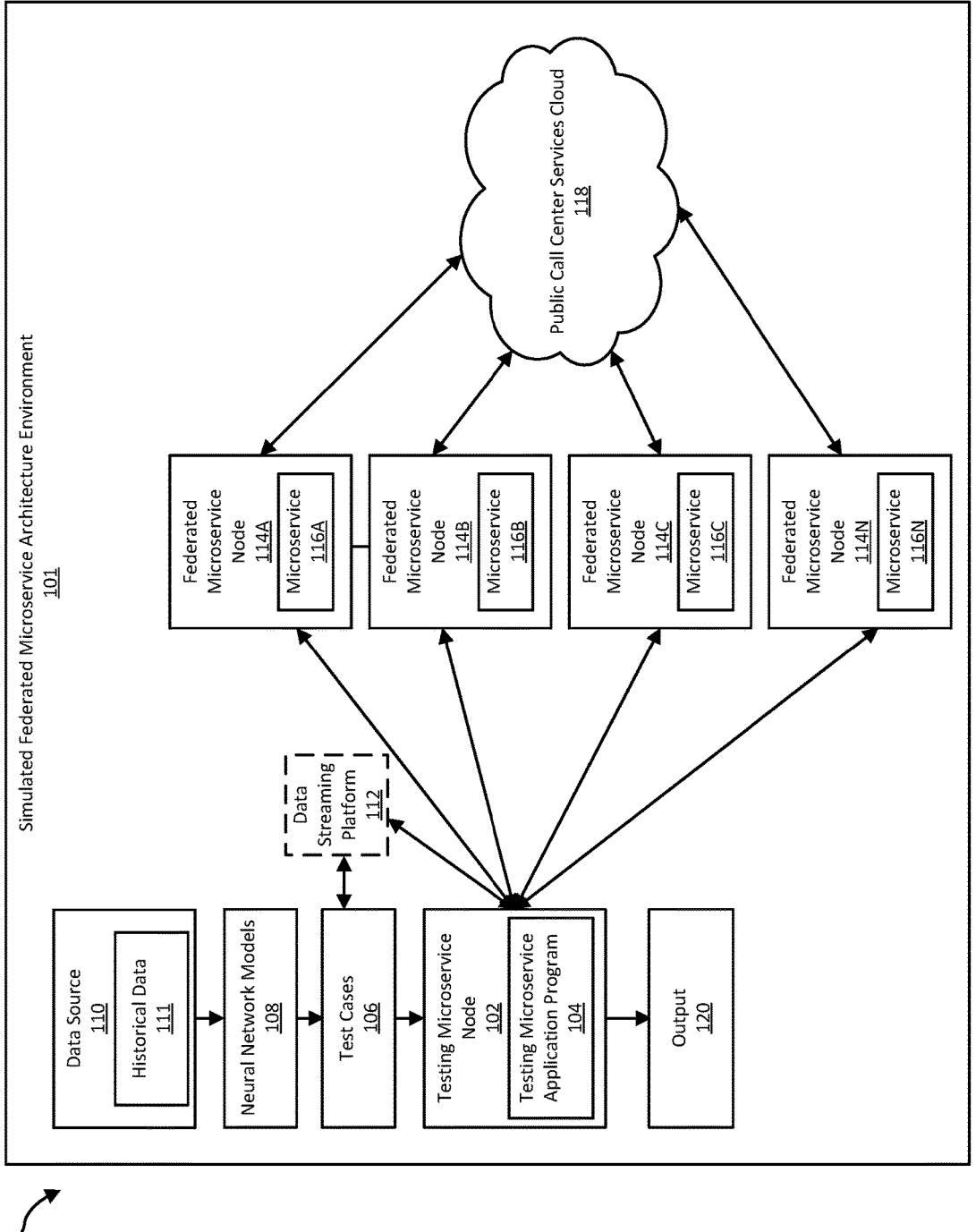
FIG. 1 depicts a system for testing federated microservice architectures according to an embodiment.

Referring to FIG. 1, a system for testing federated microservice architectures is disclosed according to an embodiment. System 100 may include a simulated federated microservice architecture environment 101. Simulated federated microservice architecture environment 101 may include a testing microservice node 102, which may communicate with one or more federated microservice nodes 114A, 114B, 114C, and 114N, for executing/evaluating test cases 106 in public call center services cloud 118. In one embodiment, testing microservice node 102 may receive test cases 106 for communication to federated microservice nodes 114A, 114B, 114C, and 114N. Optionally, testing microservice node 102 may utilize data streaming platform 112 to communicate test cases 106 to federated microservice nodes 114A, 114B, 114C, and 114N. In embodiments, data streaming platform 112 may be a managed steaming service such as the APACHE KAFKA distributed event store and stream-processing platform.

Testing microservice node 102 may include testing microservice application program 104 which functions as a microservice in simulated federated microservice architecture environment 101. Federated microservice nodes 114A, 114B, 114C, and 114N may include a set of microservices 116A, 116B, 116C, and 116N, respectively. Testing microservice application program 104 may receive test cases 106 generated from historical data 111 (e.g., previous customer interactions with call center specialists in an enterprise call center) retrieved from data source 110 (i.e., an enterprise data storage service for historical data 111). Test cases 106 may be generated utilizing neural network models 108 configured to train historical data 111. Test cases 106 may be utilized to evaluate the performance of microservices 116A, 116B, 116C, and 116N in public call center services cloud 118 which may be represented as output 120. For example, test cases 106 may be used to evaluate a predicted customer intent as compared to a call reason given by specialists at the end of a customer interaction in a call center. In embodiments, public call center services cloud 118 may represent an on-demand cloud computing platform and associated APIs such as the AMAZON WEB SERVICES (AWS) cloud platform.

Figure 2:
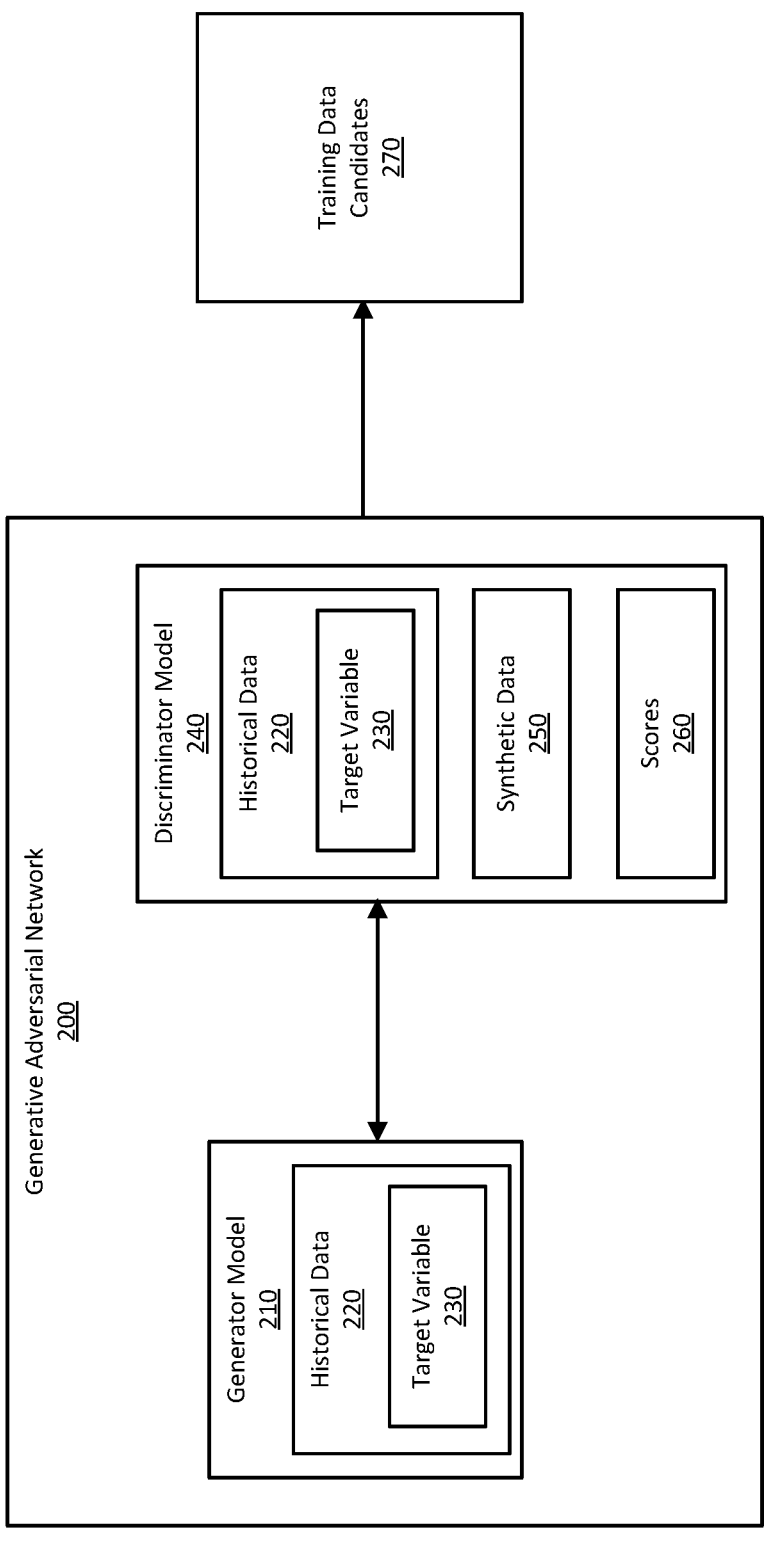
FIG. 2 illustrates a generative adversarial network that may be utilized for neural network model training and generating test cases in a federated microservice architecture environment according to an embodiment.

FIG. 2 illustrates a generative adversarial network (GAN) 200 that may be utilized for neural network model training and generating test cases in a federated microservice architecture environment according to an embodiment. GAN 200 may include a pair of neural network models including generator model 210 and discriminator model 240.

In embodiments, GAN 200 may be trained to generate training data candidates 270 for test cases by utilizing historical data 220 as initial training data in generator model 210. Historical data 220 may include a stream of call center customer and specialists conversations/utterances as well as event identifiers temporally ordered and fed to generator model 210. Historical data 220 may additionally include target variable 230 which may represent a call reason given by call center specialists at the end of a customer interaction and is utilized to determine test case success or failure. In embodiments, generator model 210 may be trained over several epochs to produce similar outputs.

In embodiments, discriminator model 240 may train historical data 220 (including target variable 230) as well as synthetic data 250 (e.g., fabricated negative cases of event streams. Discriminator model may then score training data candidates 270 (representing successful cases produced by generator model 210), to generate scores 260, based on target variable 230. In some embodiments, GAN 200 may be retrained to test new cases.

Referring to FIG. 3, a method 300 for testing federated microservice architectures locality preserving federated learning is disclosed according to one embodiment.

In step 305, a microservice testing application program may be associated with a set of microservices to create a simulated federated microservice architecture environment. For example, a microservice testing application program may be added as a new microservice to an existing federated microservice architecture environment.

In step 310, the microservice testing application program may detect relationships associated with the set of microservices. For example, the microservice application program may receive an initialization input and discover the set of microservices and the relationships in response to the initialization input.

In step 315, the microservice testing application program may generate test cases for testing a target microservice in the set of microservices. In one embodiment, the target microservice may be a combination of microservices in the set of microservices.

The microservice testing application program may generate test cases in a variety of ways which will now be described with respect to FIGS. 4-5.

Figure 4:
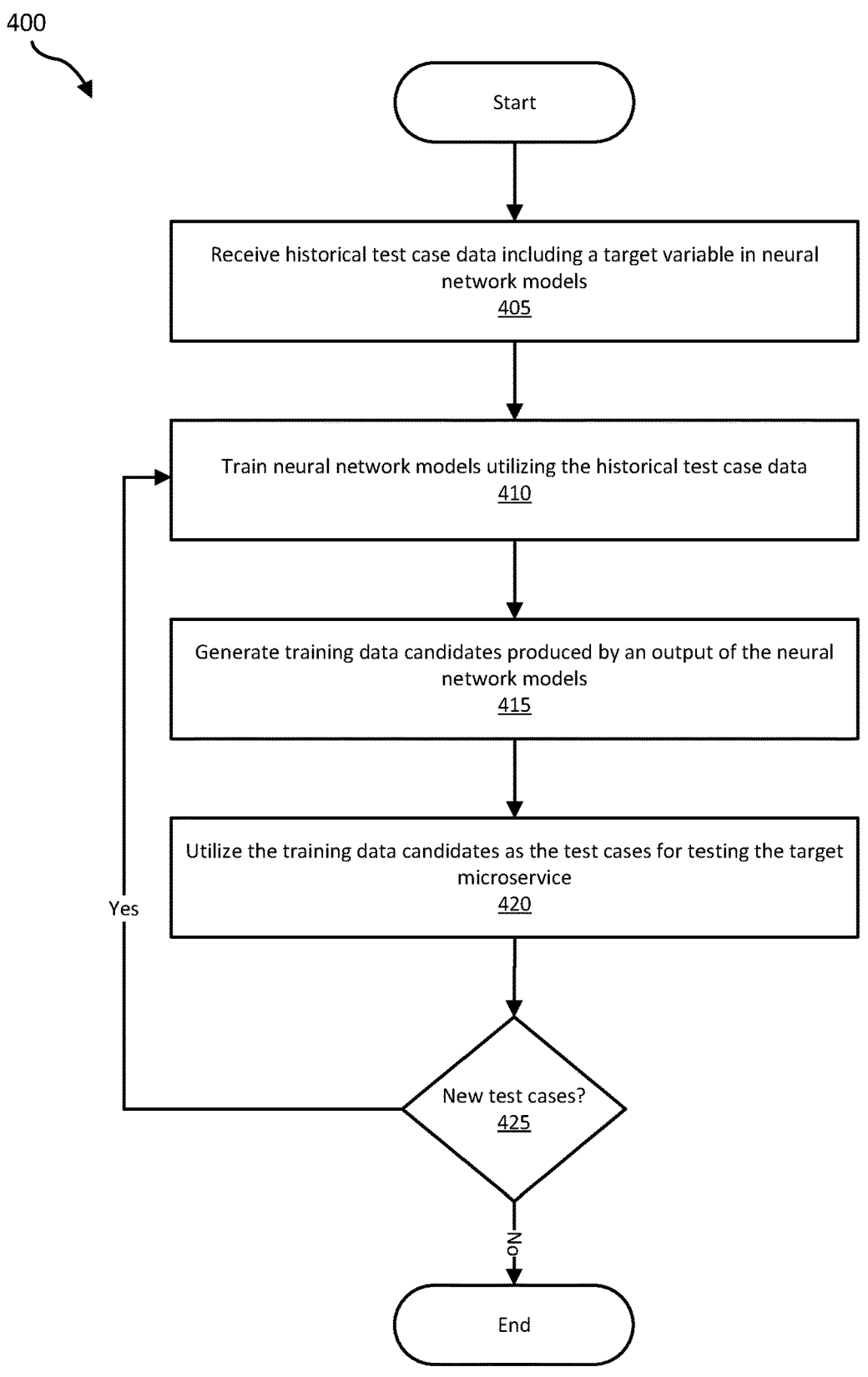
FIG. 4 depicts a method for generating test cases in a federated microservice architecture environment according to one embodiment.

Turning now to FIG. 4, a method 400 for generating test cases in a federated microservice architecture environment is discloses according to one embodiment.

In step 405, neural network models may receive historical test case data including a target variable.

In step 410, the neural network models may be trained utilizing the historical test case data. For example, a GAN generator model may train the historical test case data and a GAN discriminator model may train the historical test case data as well as synthetic data (e.g., fabricated negative test case data).

In step 415, training data candidates may be generated from an output of the neural network models. For example, scores generated by the GAN discriminator model may be evaluated against the target variable and the training data candidates may be generated based on the scores.

In embodiments, a user may specify reward/loss functions for the GAN generator and discriminator models.

In step 420, the training data candidates may be utilized as the test cases for testing the target microservice.

In step 425, if the neural network models receive new test cases, the new test cases may be utilized to retrain the neural network models at step 410. Otherwise, the method 400 then ends.

Figure 5:
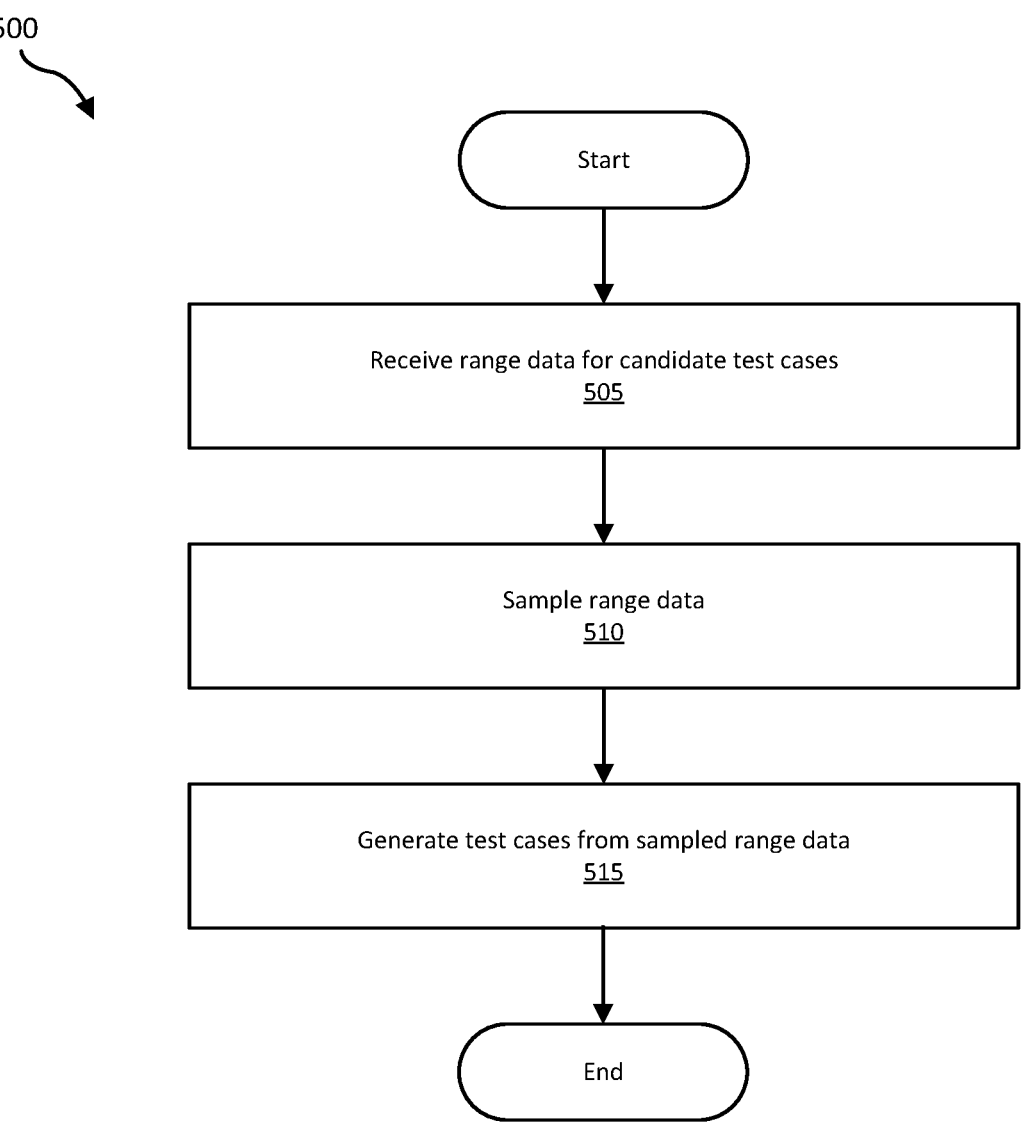
FIG. 5 depicts a method for generating test cases in a federated microservice architecture environment according to another embodiment.

Turning now to FIG. 5, a method 500 for generating test cases in a federated microservice architecture environment is discloses according to an alternative embodiment.

In step 505, the testing microservice application program may receive range data for candidate test cases. For example, a user may supply ranges of values for test cases for sampling.

In step 510, the testing microservice application program may sample the range data. For example, discrete values from a set of possible values in the range data may be sampled. As another example, numerical values from the range data may be sampled.

In step 515, the testing microservice application program may generate test cases from the sampled range data.

Returning now to FIG. 3, at step 320, the testing microservice application program may evaluate a performance of the target microservice in the simulated federated microservice architecture environment based on an output of the test cases. For example, an output of the test cases (e.g., predicted customer intents during a call center session) may be compared against the target variable to determine a result representing an expected performance of the target microservice.

Figure 6:
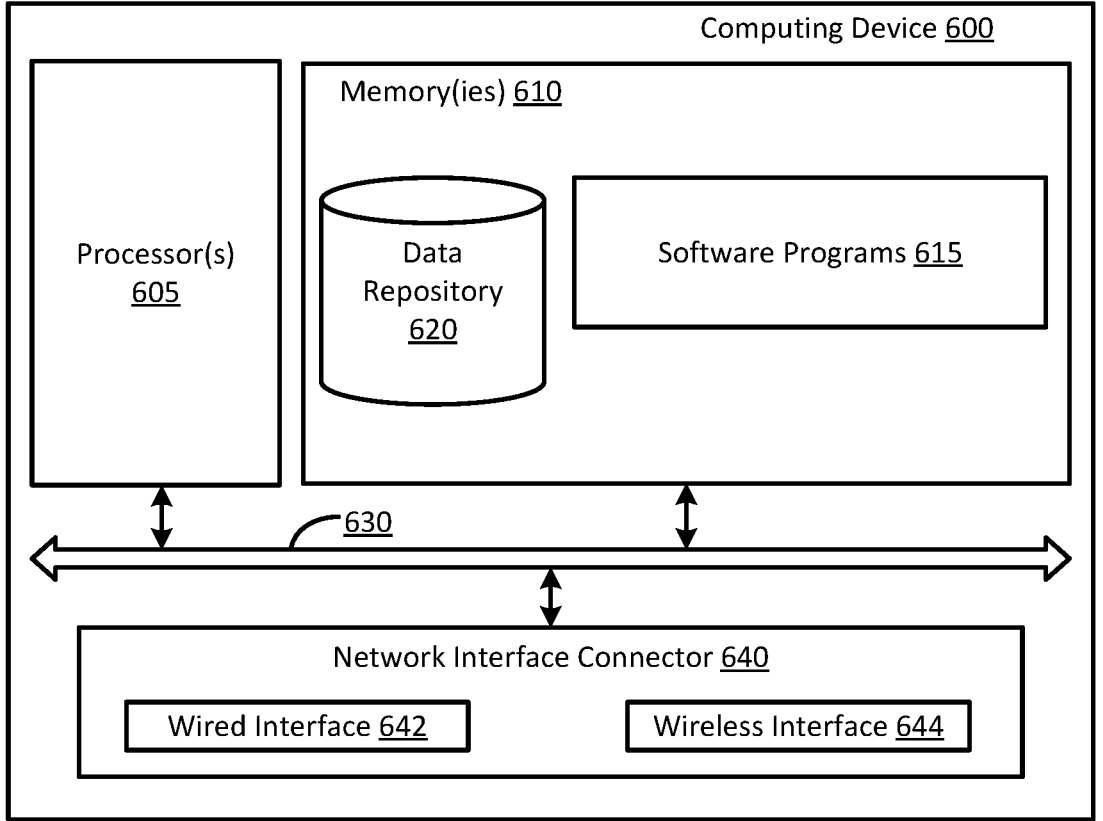
FIG. 6 depicts an exemplary computing system for implementing aspects of the present disclosure.

FIG. 6 depicts an exemplary computing system for implementing aspects of the present disclosure. FIG. 6 depicts exemplary computing device 600. Computing device 600 may represent the system components described herein. Computing device 600 may include processor 605 that may be coupled to memory 610. Memory 610 may include volatile memory. Processor 605 may execute computer-executable program code stored in memory 610, such as software programs 615. Software programs 615 may include one or more of the logical steps disclosed herein as a programmatic instruction, which may be executed by processor 605. Memory 610 may also include data repository 620, which may be nonvolatile memory for data persistence. Processor 605 and memory 610 may be coupled by bus 630. Bus 630 may also be coupled to one or more network interface connectors 640, such as wired network interface 642 or wireless network interface 644. Computing device 600 may also have user interface components, such as a screen for displaying graphical user interfaces and receiving input from the user, a mouse, a keyboard and/or other input/output components (not shown).

Although several embodiments have been disclosed, it should be recognized that these embodiments are not exclusive to each other, and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A computer-implemented method, at least a portion of the method being performed by one or more computing devices comprising at least one processor, the method comprising:

dynamically creating, by the one or more computing devices, a simulated federated microservice architecture environment that simulates an operational federated microservice architecture environment comprising a set of microservices in a plurality of nodes by dynamically adding a microservice testing application program as a new microservice in the operational federated microservice architecture environment;

dynamically detecting, by the microservice testing application program executing on the one or more computing devices, a plurality of relationships between the microservices in the set of microservices by:

receiving an initialization input for the microservice testing application program; and identifying each of the microservices in the set of microservices and the plurality of relationships in response to the initialization input;

generating, by the microservice testing application program, one or more test cases for testing a target microservice in the set of microservices by:

receiving historical test case data comprising a target variable from a data source;

training a plurality of neural network models utilizing the historical test case data; and generating training data candidates produced by an output of the neural network models;

testing the target microservice by submitting one or more test cases comprising the training data candidates as the one or more test cases to an endpoint exposed by the microservice testing application program; and evaluating, by the microservice testing application program, a performance of the target microservice in the simulated federated microservice architecture environment based on an output of the one or more test cases.

2. The computer-implemented method of claim 1, wherein training the plurality of neural network models utilizing the historical test case data comprises:

training a generator model in a generative adversarial network (GAN) on the historical test case data; and training a discriminator model in the GAN on the historical test case data and fabricated negative test case data.

3. The computer-implemented method of claim 1, wherein generating the training data candidates produced by the output of the neural network models comprises:

evaluating scores assigned to the output of the neural network models against the target variable; and generating the training data candidates based on the scores.

4. The computer-implemented method of claim 1, wherein generating the one or more test cases for testing the target microservice in the set of microservices comprises:

receiving range data for candidate test cases;

sampling the range data; and generating the one or more test cases from the sampled range data.

5. The computer-implemented method of claim 4, wherein sampling the range data comprises:

sampling discrete values from a set of possible values in the range data; and sampling numerical values from the range data.

6. The computer-implemented method of claim 1, wherein evaluating the performance of the target microservice in the simulated federated microservice architecture environment based on the output of the one or more test cases comprises comparing the output of the one or more test cases against a target variable to determine a result representing an expected performance of the target microservice.

7. The computer-implemented method of claim 1, wherein the target microservice comprises a combination of microservices in the set of microservices.

8. The computer-implemented method of claim 1, wherein the one or more test cases comprises one or more call center customer service interactions in the simulated federated microservice architecture environment.

9. A system comprising:

a testing microservice node executing a microservice testing application program and having a plurality of neural network models; and a plurality of microservice nodes representing a set of microservices in an operational federated microservice architecture environment;

wherein:

the testing microservice node communicates with the plurality of microservice nodes and dynamically creates a simulated federated microservice architecture environment that simulates the operational federated microservice architecture environment comprising a set of microservices in a plurality of nodes by dynamically adding a microservice testing application program as a new microservice in the operational federated microservice architecture environment;

the testing microservice node dynamically detects, from the plurality of microservice nodes, a plurality of relationships between the microservices in the set of microservices by:

receiving an initialization input for the microservice testing application program; and identifying each of the microservices in the set of microservices and the plurality of relationships in response to the initialization input;

the testing microservice node generates, utilizing the plurality of neural network models, one or more test cases for testing a target microservice in the set of microservices by:

receiving historical test case data comprising a target variable from a data source; and training a plurality of neural network models utilizing the historical test case data;

generating training data candidates produced by an output of the neural network models;

utilizing the training data candidates as the one or more test cases for testing the target microservice; and the testing microservice node evaluates a performance of the target microservice based on an output of the one or more test cases.

10. The system of claim 9, wherein the testing microservice node adds the microservice testing application program as a new microservice to create the simulated federated microservice architecture environment.

11. The system of claim 9, wherein the testing microservice node trains a generator model in a generative adversarial network (GAN) on historical test case data.

12. The system of claim 11, wherein the testing microservice node further trains a discriminator model in the GAN on historical test case data and fabricated negative test case data.

13. The system of claim 9, wherein the testing microservice node generates training data candidates produced by an output of the neural network models.

14. The system of claim 13, wherein the testing microservice node utilizes the training data candidates as the one or more test cases for testing the target microservice.

15. The system of claim 9, wherein the testing microservice node compares the output of the one or more test cases against a target variable to determine a result representing an expected performance of the target microservice.

16. A non-transitory computer-readable storage medium, including instructions stored thereon, which read and executed by one or more computer processors, cause the one or more computer processors to perform steps comprising:

dynamically creating a simulated federated microservice architecture environment that simulates an operational federated microservice architecture environment comprising a set of microservices in a plurality of nodes by dynamically adding a microservice testing application program as a new microservice in the operational federated microservice architecture environment;

dynamically detecting, by the microservice testing application program, a plurality of relationships between the microservices in the set of microservices by:

receiving an initialization input for the microservice testing application program; and identifying each of the microservices in the set of microservices and the plurality of relationships in response to the initialization input;

generating, by the microservice testing application program, one or more test cases for testing a target microservice in the set of microservices by:

receiving historical test case data comprising a target variable from a data source;

training a plurality of neural network models utilizing the historical test case data; and generating training data candidates produced by an output of the neural network models;

testing the target microservice by submitting one or more test cases comprising the training data candidates as the one or more test cases to an endpoint exposed by the microservice testing application program; and evaluating, by the microservice testing application program, a performance of the target microservice in the simulated federated microservice architecture environment based on the one or more test cases.

17. The non-transitory computer-readable storage medium of claim 16, wherein the microservice testing application program trains a generator model in a generative adversarial network (GAN) on a historical test case data and trains a discriminator model in the GAN on the historical test case data and fabricated negative test case data.

* * * * *